United States Patent [19]

Krisko

[11] Patent Number: 4,915,196

[45] Date of Patent: Apr. 10, 1990

[54] HIGH OUTPUT POWER GENERATOR

[76] Inventor: Peter Krisko, 199 Willow St., Bridgeport, Conn. 06610

[21] Appl. No.: 343,733

[22] Filed: Apr. 27, 1989

[51] Int. Cl.$^4$ ............................................. F03G 7/08
[52] U.S. Cl. ..................................... 185/27; 74/60; 290/1 R; 384/497; 384/571
[58] Field of Search ................... 74/60; 185/4, 27, 19; 290/1 R; 384/497, 571

[56] References Cited

U.S. PATENT DOCUMENTS

| | | | |
|---|---|---|---|
| 85,220 | 12/1868 | Drasch | 185/27 |
| 244,799 | 7/1881 | Dye | 185/27 R |
| 460,736 | 10/1891 | Williams et al. | 185/27 |
| 542,359 | 7/1895 | Chaquette | 185/27 X |
| 556,583 | 3/1896 | Marquand | 185/19 |
| 1,916,873 | 7/1933 | Wiggins | 290/1 X |
| 4,071,114 | 1/1978 | Schera, Jr. | 185/30 |
| 4,238,687 | 12/1980 | Martinez | 290/1 R |
| 4,239,975 | 12/1980 | Chiappetti | 290/1 R |

Primary Examiner—Allan D. Herrmann
Attorney, Agent, or Firm—Kramer, Brufsky & Cifelli

[57] ABSTRACT

A high output power generator incorporating a weighted load member having a substantially circular base is disclosed. A structural support has an enclosure for receiving the weighted load member. Levers are disposed at the base of the enclosure and are operatively attached to a rotatable power shaft. A weighted member rolls the weighted load member, while in a tilted position, about the edge of its circular base so that the weighted load member presses on successive levers to rotate the power shaft.

11 Claims, 2 Drawing Sheets

HIGH OUTPUT POWER GENERATOR

While the invention is subject to a wide range of applications, it is particularly related to a high output, power generator. Specifically, a movable weight presses on levers attached to connecting rods causing a crankshaft to turn a generating device.

In the past, a number of systems were known for generating power. For example, U.S. Pat. No. 85,220 discloses a rotating ball motor wherein an annular tilting tray forms the orbit for a revolving ball. A lever extending into the tray connects with a shaft to which motion is to be imparted. By continually changing the position of the tray, the ball is caused to rotate therein and act on the lever to impart motion to the shaft.

Another patent disclosing a device for producing power is described in U.S. Pat. No. 244,779 wherein a horse-power mechanism combines a continuously acting lever and an endless inclined plane. The plane can be a circular disc pivoted at its center on a ball and socket to enable the disc to oscillate by the weight of a draft animal moving around the perimeter of the disc.

It is also known in the prior art to provide a plurality of levers which are connected to a crankshaft whereby movement of the levers through the pressure of a heavy weight causes the rotation of a rod and power transmitting generator. Patents illustrating this principle include U.S. Pat. Nos. 542,359; 1,916,873; 4,071,114; 4,238,687 and 4,239,975.

It is a problem underlying the present invention to provide a high output power generator which can be installed in any desired location.

It is an object of the present invention to provide a high output power generator which obviates one or more of the limitations and disadvantages of the described prior arrangements.

It is a further advantage of the present invention to provide a high output power generator which can be placed in any desired location.

It is a still further advantage of the present invention to provide a high output power generator which is relatively inexpensive to operate.

Accordingly, there has been provided a high output power generator incorporating a weighted load member having a substantially circular base. A structural support has an enclosure for receiving the weighted load member. Lever means are disposed at the base of the enclosure and are operatively attached to a rotatable power shaft. Means are also provided for tilting the weighted load member on its bottom and rolling the weighted load member over the lever means to rotate the power shaft.

BRIEF DESCRIPTION OF THE DRAWINGS

The invention and further developments of the invention are now elucidated by means of preferred embodiments shown in the drawings.

DETAILED DESCRIPTION OF THE PREFERRED EMBODIMENT

Figure 1:
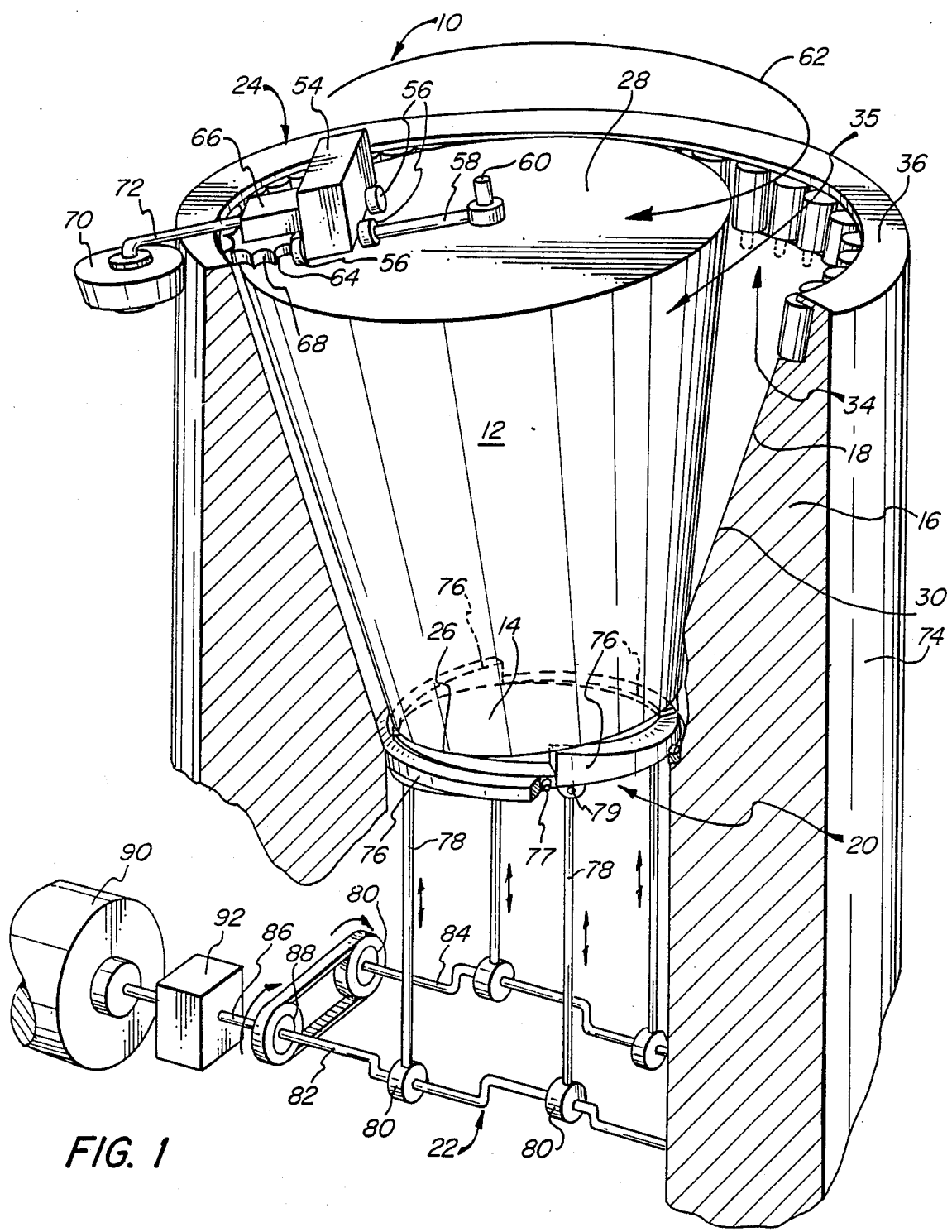
FIG. 1 is a schematic diagram of a high output power generator in accordance with the present invention.

A high output power generator 10 is disclosed. The power generator 10 includes a weighted load member 12 having a substantially circular base 14. A structural support component 16 has an enclosure 18 for receiving the weighted load member 12. Lever means 20 are disposed at the base of the enclosure 18. The lever means are operatively attached to a rotatable power shaft 22. Means 24 are further provided for tilting the weighted load member 12 on the edge 26 of its circular base 14 and rolling the weighted load member over the lever means 20 for operating the power shaft 22.

Referring to FIG. 1, there is illustrated the weighted load member 12. Preferably, it has a substantially frustroconical shape with an upper surface 28 and a lower circular base surface 14. The load member is preferably of a very heavy weight and can be formed of a material such as cement. It is understood, that a very heavy weight such as between two to twenty tons, although any weight is applicable, can be most easily moved by tilting it on the edge 26 of base surface 14. This will be explained further hereinafter.

Figure 2:
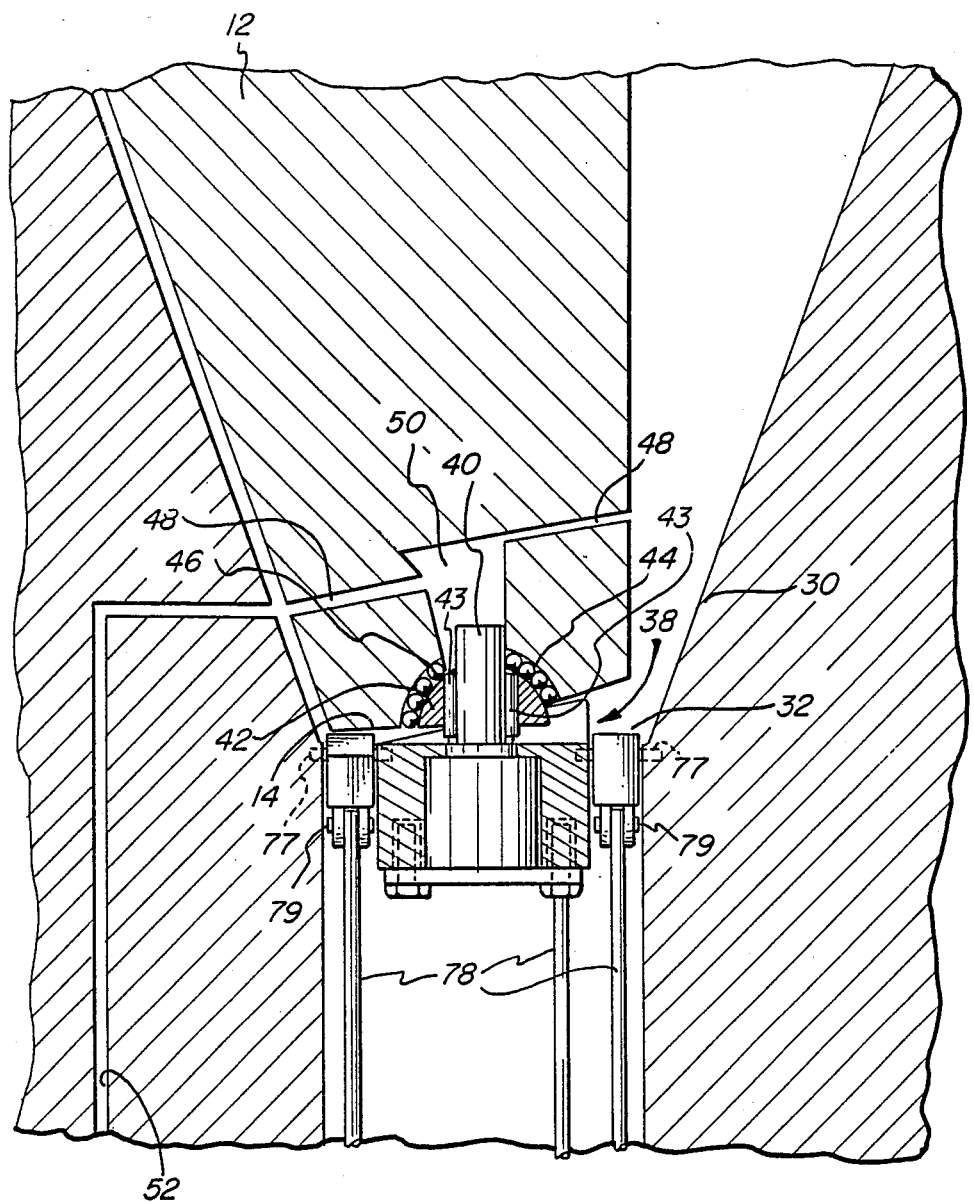
FIG. 2 is a schematic diagram of a bearing structure supporting a weighted load member at the base of an enclosure formed in a structural support in accordance with the present invention.

The weighted load member is received within an enclosure 18 which has a sloped wall 30 and a base 32, as best seen in FIG. 2. The base 32 of the enclosure is preferably sealed to enable a lubricant such as oil to be contained within the enclosure 18.

Bearing means 34 are preferably disposed about the enclosure walls for supporting the upper end 35 of the load member 12. Preferably, the bearings are disposed adjacent the upper surface 36 of the structural support 16. These bearings 34 can be comprised of a plurality of adjacently disposed cylindrical bearings as illustrated in FIG. 1. It is understood, that as the load member 12 rolls about the enclosure 18, it is primarily in contact with the cylindrical roller bearings 34 and thereby reduces the power needed to rotate the load member by the means for tilting and rolling 24.

Although the bearings are illustrated as being adjacent the upper surface 36 of the structural support 16, it is also within the terms of the present invention to provide the bearing means at other locations such as between the top surface 36 and the base 32 of the enclosure 18.

The load member 12, as seen in FIG. 2, is supported on a bearing support means 38 which enables the load member to tilt and simultaneously rotate within the enclosure 18. The bearing support means 38 includes an upstanding post 40 which is disposed at the approximate center of the base 32 of the enclosure 18. A hemispherically shaped element 42 is attached to the upstanding post 40 by splined key elements 43. The circular base 14 of the load member also includes a hemispherically shaped cavity 44 whereby bearings 46 provided between the hemispherically shaped structure 42 and the hemispherically shaped cavity 44 enable the load member to both tilt and rotate as discussed further hereinafter.

In the lower section of the load member 12, passageways 48 are connected to a lubricant cavity 50 in communication with the base of the load member 12. The structural support 16 also includes a lubricant passage 52 for directing a lubricant into the enclosure 18. The lubricant, such as for example oil, is disposed in the enclosure 18 and can flow through the passageways 48 to lubricate the bearings 46.

The structure 24 for tilting the load member 12 includes a power driven weighted structure 54 which has driving wheels 56 and a rod element 58 for tethering the structure 54 to the center of the upper surface 28 of the load member 12. The rod 58 can be connected to an upstanding center post 60 which is attached to load member 12. It is also within the terms of the present invention to drive the center post 60 and apply the rotating force through the rod 58 to move the weighted structure 54 about the perimeter of the surface 28 of the load member. The structure 54 is weighted so that it tends to balance the load member on an edge 26. As the structure 54 moves about the periphery of the load member, the load member will naturally roll about the upper surface 36 of the structural support 16. To control the timing of the rotational movement of the load member 12, as indicated by arrow 62, a gear device 64 is rotatably attached to a support 66 which is, in turn, attached to the structure 54. The gear teeth 68 are shaped so that they mesh with the bearings 34. A wheel 70 is attached to the structure 54 by any desired means such as a rod 72. The wheel is positioned with respect to the gear 64 to cause a pinching action between the gear 64 and the cylindrical outer surface 74 of the structural support 16.

An important aspect of the present invention relates to the lever devices 20 which are operated by edge 26 of the load member 12. The lever members 20 include a plurality of levers 76 which pivot at one end, about a fixed pivot pin 77, as illustrated in FIGS. 1 and 2, and are connected to reciprocating rods 78 at a second end by conventional means such as pins 79. The rods 78, in turn, are attached by journals 80 which rotate crankshafts 82 and 84. The crankshafts 82 and 84 are used to jointly-power-a shaft 86 through means such as belt driven wheels 88. The shaft 86 can operate any device such as a conventional electric power generator 90. A gearbox 92 can be incorporated to control the rotational speed of the generator.

To further understand the present invention an explanation of its operation follows.

The load member 12 is normally tilted on one edge 26 so as to rest against bearings 34. To begin operation of the system 10, the weighted member 54 is moved, by any means such as a motor within the structure 54 to turn the wheels 56. Structure 54 then moves about the top surface 28 of the load member 12. This movement, which is indicated by arrow 62 as being in a clockwise direction, although either direction is functional, causes the load member 12 to roll about the bearings 34. Simultaneously, the gear member 64 engages the bearings 34 and steadies the movement of the load member as it transverses adjacent the upper surface 36 of the structural member 16. The spacing relationship between the wheel 70 and the gear 64 also tends to keep the load member positioned against the rollers 34. It is also within the terms of the present invention to power the gear 64 and cause the weighted member to drive the load member 12.

As the load member 12 traverses about the inner periphery of the upper surface 36, the lower edge 26 alternately presses on the levers 20 and causes the rods 78 to reciprocate and turn the shafts 82 and 84 which ultimately powers the power generator 90.

The patents disclosed herein are incorporated by reference in their entireties herein.

It is apparent that there has been provided in accordance with the present invention a high output power generator which satisfies the objects, means, and advantages set forth hereinabove. While the invention has been described in combination with the embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. A high output power generator, comprising:
   a weighted load member having a substantially circular base;
   a structural support means having an enclosure for receiving said weighted load member;
   lever means being disposed at the base of the enclosure, the lever means being operatively attached to a rotatable power shaft;
   means for tilting said weighted load member on the edge of its circular base and rolling said weighted load member over the lever means for rotating said power shaft.

2. The high output power generator of claim 1 wherein said weighted load member has a substantially frusto-conical shape with a flat upper surface.

3. The high output power generator of claim 2 wherein said means for tilting said weighted load member comprises a movable weight driven about the outer perimeter of said upper surface.

4. The high output power generator of claim 3 wherein the tilting means includes means for connecting the movable weight to the center of the upper surface of the load member.

5. The high output power generator of claim 4 wherein;
   the structural support means has a substantially cylindrical outer surface;
   the enclosure has walls which slope outward from the base of the enclosure; and
   bearing means are disposed about the enclosure walls for supporting the upper end of the load member.

6. The high output power generator of claim 5 wherein the tilting means further comprises gear means engaging the bearing means for controlling the movement of the load member about the sloped walls of the enclosure.

7. The high output power generator of claim 6 wherein the tilting means further comprises wheel means adapted for rolling on the outer cylindrical surface of the structural support means to maintain engagement of the gear means with the bearing means.

8. The high output power generator of claim 7 wherein the base of the enclosure further includes bearing support means for enabling the load member to tilt and simultaneously rotate within the enclosure.

9. The high output power generator of claim 8 wherein the bearing support means includes:
   a upstanding post disposed at the center of the base of the enclosure;
   a hemispherically shaped element attached to the upstanding post, and
   bearings between the load member and the hemispherically shaped element to enable the load member to tilt and rotate relative to the upstanding post.

10. The high output power generator of claim 9 wherein said enclosure contains a lubricant means for reducing friction between the bearing support means and the load member.

11. The high output power generator of claim 10 wherein said lubricant means further comprises passage means in said structural support means and said load member for providing lubricant passage in and out of the enclosure.

* * * * *